M. W. PIFER.
GRAPEFRUIT CORER.
APPLICATION FILED MAY 20, 1920.
1,351,216.
Patented Aug. 31, 1920.
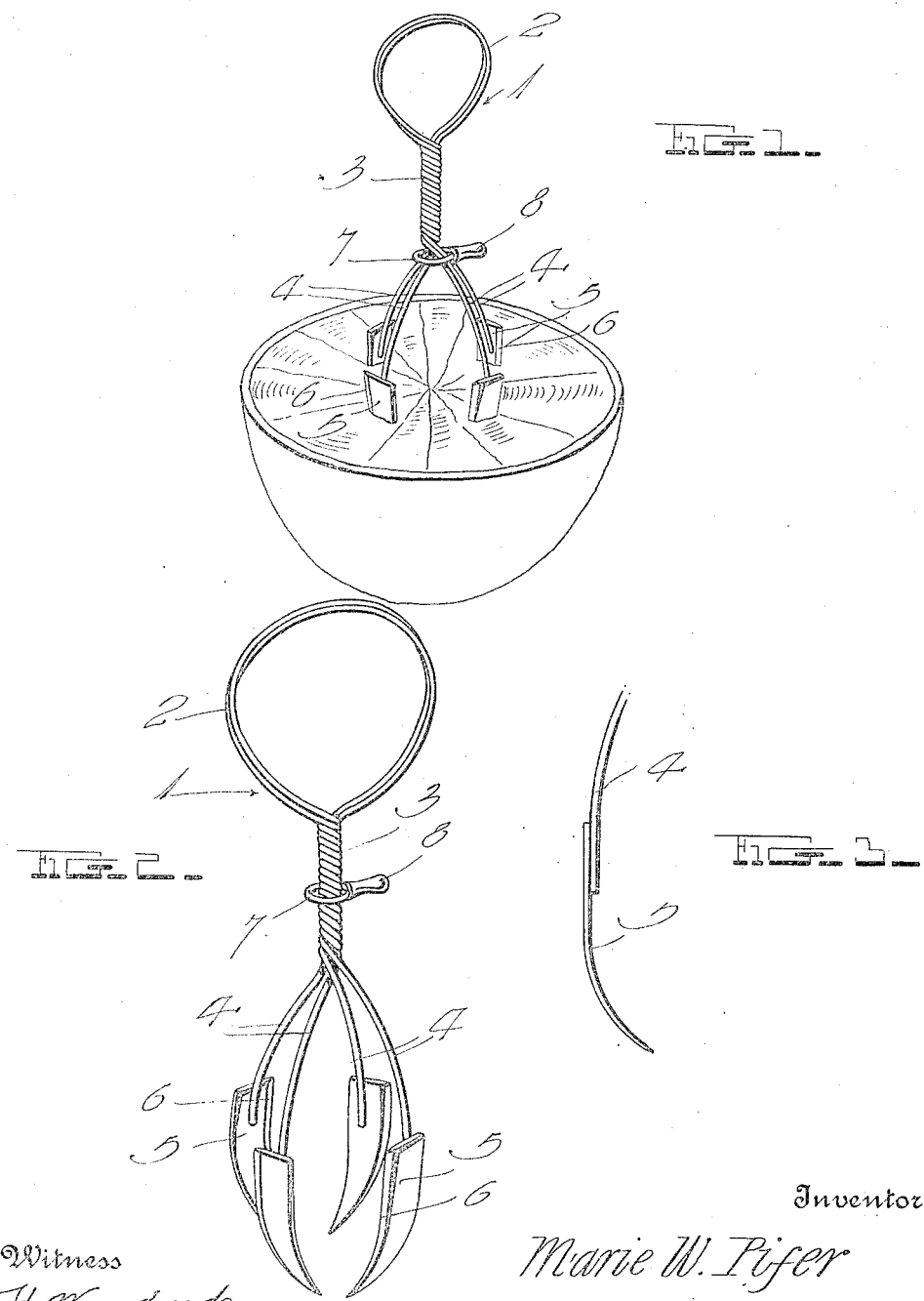
Witness
H. Woodard
Inventor
Marie W. Pifer
By H. R. Willson &co
Attorneys

UNITED STATES PATENT OFFICE.

MARIE WATSON PIFER, OF SULLIVAN, ILLINOIS.

GRAPEFRUIT-CORER.

1,351,216.  Specification of Letters Patent.  Patented Aug. 31, 1920.

Application filed May 20, 1920. Serial No. 382,853.

*To all whom it may concern:*

Be it known that I, MARIE WATSON PIFER, a citizen of the United States, residing at Sullivan, in the county of Moultrie and State of Illinois, have invented certain new and useful Improvements in Grapefruit-Corers; and I do declare the following to be a full, clear, and exact description of the invention, such as will enable others skilled in the art to which it appertains to make and use the same.

This invention relates to an improved implement designed for removing cores from grape-fruit.

The object of the invention is to provide a novel article of the above mentioned type which is of such construction that it will effectively cut the core and grip so that it may be lifted out of the cavity and deposited in a suitable receptacle, there being no necessity to touch the pulp of the fruit with the hands or inverting the fruit in order to dump the core out of the cavity as is usually done, which operation wastes some of the juice of the fruit.

Another object of the invention is to provide an implement of this class which is simple and effective, it being made of few inexpensive parts which makes it possible to retail and manufacture the device at an extremely low cost.

Other objects and advantages of the invention will be apparent during the course of the following description.

In the accompanying drawings forming a part of this specification and in which like numerals are employed to designate like parts throughout the same:

Figure 1 is a perspective view of an implement constructed in accordance with my invention, showing the manner of using the same.

Fig. 2 is an enlarged detail perspective view of the implement as it appears preparatory to being placed into use.

Fig. 3 is a detail view of one of the cutting blades.

In carrying out my invention I employ a body member including a handle and a plurality of expansible arms each of which carries a longitudinally curved cutting blade. Also associated with the device and slidably mounted on the handle thereof is a member for contracting the arms, whereby the blades will be moved inwardly toward each other so as to grip the core and permit it to be lifted out of the cavity.

Referring to the drawings wherein I have shown a preferred embodiment of my invention, it will be seen that the implement is constructed from two strands of wire 1, each of which is bent between its ends to form a loop 2 which serves as a hand-grip. The wires after being bent to form the hand-grip, are twisted about one another in the manner shown to form a shank 3. The four ends of the wire are left untwisted so as to provide resilient arms 4 which diverge from the shank 3. Fastened on each of the arms by means of solder or the like, are longitudinally curved blades 5 each of which has one of its edges sharpened as at 6 to provide the cutting edge. Due to the resiliency of the arms, it will be seen that they may be moved toward and from each other. This construction is advantageous in view of the fact that it permits the blades to be moved inwardly toward each other so as to grip the core, whereby it may be lifted out of the cavity when the implement is withdrawn. In order to effectively contract the arms and blades to accomplish the above mentioned result, I make use of a novel contracting member. While this member may be of some other construction, I desire to employ an ordinary ring 7 for the purpose, this ring being slidably mounted on the shank 3 and being adapted to be forced down onto the arms 4 so as to contract them as is obvious. To facilitate and permit this ring 7 to be easily operated, I equip it with a small handle 8.

The operation of the device is as follows:

The curved blades 5 are first pushed into the halved grape-fruit in such a way as to cause them to surround the core. Next the handle 8 is gripped, and the contractor ring is forced down onto the arms 4 causing the blades to move inwardly toward each other. Now, the grape-fruit may be held with the left hand and the hand-hold gripped with the other hand rotated from right to left. Such operation will sever the tough fibrous part of the fruit and the core may be lifted out when the implement is withdrawn.

An implement constructed in accordance with my invention will be found extremely useful in that it will enable persons to easily and readily remove the core, and it will make an extremely neat job. By using such an implement it will be totally unnecessary to touch the pulp of the fruit with the hands, as is ordinarily necessary. Such a device will be found extremely useful for hotel use wherein grape-fruit is very popular.

From the foregoing description taken in connection with the accompanying drawings, it is believed that the reader will be able to obtain a thorough understand of the construction and use of my invention. In view of this, it is thought that a more lengthy description is unnecessary.

It is to be understood that the form of my invention herein shown and described is to be taken as a preferred form of the same, and that various minor changes in the shape, size, and arrangement of parts may be resorted to without departing from the spirit of the invention or the scope of the subjoined claims.

I claim:

1. An article of the class described comprising a body member including a plurality of expansible spring arms, a cutting blade secured to each arm, and means operatively associated with said arms for flexing them and moving them toward and from each other.

2. An article of the class described comprising a handle, a plurality of spring arms on said handle, arcuate cutting blades carried by the arms, and longitudinally slidable means on said arms for moving them toward each other.

3. A device of the class described comprising a handle, a plurality of resilient arms carried by and diverging from the handle, blades carried by said arms, and a ring slidable on the handle, whereby when the ring is forced onto the arms, the latter will be contracted.

4. A device of the class described composed of wire bent to form a hand-grip and a shank, the free ends of the wire forming divergent resilient arms, longitudinally curved blades secured on the arms, and a contracting ring slidable on said shank, being adapted to be forced down on the arms so as to move the blades and arms inwardly toward each other.

In testimony whereof I have hereunto set my hand.

MARIE WATSON PIFER.